United States Patent [19]

Gassmann

[11] 4,238,849

[45] Dec. 9, 1980

[54] METHOD OF AND SYSTEM FOR TRANSMITTING TWO DIFFERENT MESSAGES ON A CARRIER WAVE OVER A SINGLE TRANSMISSION CHANNEL OF PREDETERMINED BANDWIDTH

[75] Inventor: Gerhard-Günter Gassmann, Esslingen-Berkheim, Fed. Rep. of Germany

[73] Assignee: International Standard Electric Corporation, New York, N.Y.

[21] Appl. No.: 970,835

[22] Filed: Dec. 19, 1978

[30] Foreign Application Priority Data

Dec. 22, 1977 [DE] Fed. Rep. of Germany ....... 2757171

[51] Int. Cl.³ .......................... H04J 9/00; H04J 11/00
[52] U.S. Cl. ...................................... 370/11; 370/20; 370/76; 370/100; 370/74
[58] Field of Search ........ 179/15 BM, 15 FD, 15 BP, 179/15 BW, 15 BC, 15 BS, 15 BY

[56] References Cited

U.S. PATENT DOCUMENTS

| 3,261,922 | 7/1966 | Edson et al. | 179/15 BM |
| 3,426,151 | 2/1969 | Tygart | 179/15 FD |
| 3,710,257 | 1/1973 | Low et al. | 179/15 BC |
| 3,917,906 | 11/1975 | Johnson et al. | 179/15 FD |

*Primary Examiner*—Douglas W. Olms
*Attorney, Agent, or Firm*—John T. O'Halloran; Peter C. Van Der Sluys

[57] ABSTRACT

In a radio broadcoast channel, an additional message is superimposed on the normal message so as to be inaudible to the listener. To accomplish this, the additional message, consisting of digital signals, is modulated on a subcarrier lying in the ear-physiological masking range of the normal message. During breaks and very quiet intervals of the normal transmission, the signal transmission is interrupted because no masking occurs during those times. To make this possible, the transmission of the normal message is delayed by at least one signal length.

26 Claims, 9 Drawing Figures

METHOD OF AND SYSTEM FOR TRANSMITTING TWO DIFFERENT MESSAGES ON A CARRIER WAVE OVER A SINGLE TRANSMISSION CHANNEL OF PREDETERMINED BANDWIDTH

The present invention relates to a method of transmitting two different messages on a carrier wave over a single transmission channel of predetermined bandwidth, the first of which messages is a sound message continuously varying in volume and is transmitted in a baseband essentially filling the transmission channel, and the second message of which is divided into information units, wherein the information units of the second message are transmitted as a multiplex signal on at least one pilot signal in a pilot band lying within the transmission channel, wherein the pilot band is located outside the baseband but within the masking range for inaudible tones, which reaches laterally beyond the baseband and is limited by an ear-physiological threshold of audibility and whose level is directly dependent on the volume of the sound message in the baseband, and wherein, in addition, a sync signal is transmitted on a pilot signal in the pilot band.

To use radio broadcasts for the transmission not only of sound messages but also of a second message has been known for a long time. In the USA, for example, there was a home facsimile system in which home facsimile apparatus was connected to broadcast receivers. One of the disadvantages of that apparatus was that signals of the second message could only be received outside the usual broadcasting times.

In a method known from U.S. Pat. No. 3,894,190, a second message is transmitted simultaneously with the transmitter's actual sound message over a limited sound transmission channel. The sound message, which is transmitted in a baseband, fills nearly the entire width of the transmission channel. The sound message in this baseband generates a masking range which is limited by ear-physiological threshold of audibility and projects laterally beyond the baseband. The level of this masking range is dependent on the instantaneous mean volume of the sound message in the baseband. Signals lying outside the baseband remain inaudible to the listener as long as they do not exceed the masking range in frequency or amplitude.

In the known method, the second message is modulated as a multiplex signal on at least one pilot signal in a narrow pilot band outside the baseband but within the masking range. The second message to be transmitted is the overtone range of the information transmitted in the baseband. The overtone range is divided into frequency sections, and the mean volume of each frequency section or information unit is transmitted as a multiplex signal in the pilot band.

This known method is disadvantageous in that the sync signals, which are necessary for the multiplex operation and are also modulated on the pilot signals in the pilot band, must be kept so small that the pilot signal component modulated therein will not exceed the ear-physiological threshold of audibility even if the volume of the sound message is very low, so the sync signals lie near the noise level. At the receiving end, such sync signals cannot be evaluted or evaluation is only possible at considerable expense. Thus, at low volumes, there is the risk of the multiplex operation getting out of step.

It is a prerequisite for the above transmission methods that they be compatible with existing transmission methods and particularly with existing broadcast transmission methods, i.e., they must not interfere with the equipment, particularly the receivers, of existing transmission systems. The known transmission method is compatible with the existing broadcasting methods.

The object of the invention is to permit, in a transmission method of the kind referred to above, perfect synchronizatioan of the multiplex operation even if the first message includes extended portions of low volume, without compatibility being lost.

The invention is characterized in that the first message is transmitted with a delay which is greater than the time of a number k of multiplex cycles forming a signal unit, that from the first message a volume signal is derived which is proportional to the first message and is delayed by the same time as the first message, that the information units of the second message or the pilot signals are positively modulated with the delayed volume signal, for which purpose the delayed volume signal is attenuated to the extent that the amplitudes of the pilot signals and of their spectra always lie in the masking range below the ear-physiological threshold of audibility, that, during a silent interval or a period of low volume of the first message, the transmission of the signals in the pilot band is interrupted at the end of a signal unit forming part of the second message and being transmitted at the beginning of the silent interval or of the period of low volume, that after the end of the silent interval or of the period of low volume, the transmission of the sync signals is continued with the same delay as that of the first message, and that after a subsequent additional delay which is at least equal to the synchronization time of the multiplex operation, the transmission of the second message is continued as well.

With the measures of the invention, the signals in the pilot band always remain below the physiological threshold of audibility, so that in commercially available receivers of existing broadcasting systems, no steps are necessary to suppress the pilot band if these receivers are influenced by a transmission method according to the invention. The delay lines advantageously permit a signal unit of the second message to be always completely transmitted even in the event of unforeseen volume reductions or silent intervals of the first message, and prevent any mutilation of the second message. Another advantage is that the turn-off threshold for the transmission of the second message can be easily adapted to be transmission requirements and particularly to the receiving conditions. Compared to the presently known methods, the transmission method according to the invention has the additional advantage of being usable for short- or medium-wave transmission, so that broadcasting is possible over long distances.

According to an advantageous aspect of the invention, which is characterized by the features of claim 2, the frequency range of the first message, which lies in the pilot band and, therefore, is suppressed, is advantageously replaced by the frequency of the pilot signal or by the frequencies of the pilot signals.

Further advantageous aspects of the transmission method according to the invention are set forth in subclaims 3 and 4, with quadrature demodulation permitting a particularly low-noise separation of the second message from the sync signals at the receiving end.

The invention further relates to a system for carrying out the transmission method according to the invention. Such a transmission system comprises, for example, at least one transmitter, a transmission path, and at least one receiver, wherein the transmitter contains a sound source for generating the first message, a band-pass filter for the baseband, a multiplexer for multiplexing the information units of the second message, a clock generator for stepping the multiplexer, a frequency divider connected to the clock generator and generating the sync signals, a pilot generator for generating at least one pilot signal, a modulating arrangement which modulates the multiplexed information units and the sync signals upon the pilot signals, and an adding circuit which adds the information contents for the transmission channel, and wherein at least one receiver has, besides a radio-frequency unit and an audio-frequency unit, a demultiplexer unit for receiving the second message, said demultiplexer unit consisting of a pilot-band filter, a demodulator for recovering the information units of the second message and of the sync signals, a demultiplexer operating at the same stepping rate as that of the multiplexer, a following storage-type output circuit, and a clock generator for controlling the demultiplexer steps which is capable of being synchronized by the sync signals.

A system of this kind is also known from the above-mentioned U.S. Pat. No. 3,894,190. The transmitter of the known system contains band-pass filters for the baseband of the sound message and for the individual frequency sections of the overtone range. The individual overtone sections are rectified, applied to a time-division multiplexer, and together with a sync signal derived by frequency division of the signal of a clock generator, is positively modulated as a multiplex signal onto a pilot signal. "Positively modulated" means that the amplitude of the output signal—i.e., of the modulated pilot signal—is proportional to the amplitude of the modulating signal. This signal is added in the pilot band to the signal in the baseband and transmitted on an RF carrier wave over the appropriate channel. In a receiver tuned to this channel, the pilot band is passed through a pilot-band filter and applied to a demodulating arrangement, and the time-division multiplex signals are applied, via a demultiplexer controlled by a synchronizable clock generator, to a storage-type output circuit which contains for each multiplex signal a storage capacitor, a tone generator corresponding to the overtone section, and a positive modulator, generates an equivalent tone equal in volume, and adds it to the baseband.

To attain the above-defined object of the invention, an improvement of the foregoing system for carrying out the method according to the invention is characterized in that the transmitter contains, firstly, an information-storing and control arrangement for the second message whose clock input is connected to the output of the clock generator or of the frequency divider, and which applies the information units to the signal inputs of the multiplexer according to the control by the clock signals or output signals of the frequency divider at the clock input and to the signal character of the second message, secondly, a branch inserted between the band-pass filtr for the baseband and a start-stop input of the information-storing and control arrangement and consisting of a volume-measuring device, a threshold switch and a start-stop circuit in series, thirdly, a first delay line inserted between the output of the band-pass filter and the adding circuit and providing a delay greater than the time of a number of multiplex cycles forming a signal unit, fourthly, a series arrangement inserted between the output of the volume-measuring device and an input for positive modulation of the pilot band of the modulator and consisting of an attenuator, a second delay line providing a delay equal to that of the first delay line, and a positive modulator, the attenuation of the attenuator being adjusted so that the instantaneous value of the volume signal lies exclusively within the masking range of the sound message of the baseband, that, fifthly, the output of the threshold switch is connected to a start-stop input of the pilot generator and to a start input of the start-stop circuit via a third delay line which provides a delay equal to that of the first delay line, that the threshold of the threshold switch is adjusted so that the threshold switch interrupts the generation of an output signal as long as the volume signal applied to its input does not reach a value at which the amplitude of the pilot signal is greater than the ear-physiological threshold of audibility of the associated masking range, and that the start-stop circuit is designed so that, if no signal appears at its signal input connected to the threshold switch, it continues to generate an operating signal for the information-storing and control arrangement until a signal appears at a stop input connected to the output of the clock generator or of the frequency divider via a pulse shaper, and that, when a signal is applied to its signal input, the start-stop circuit does not begin to generate an operating signal until a signal appears at the start input, which is connected to the third delay line.

The principal advantage of the foregoing improvement of a transmission system according to the invention is that all delay elements in the transmitter provide the same delay and, thus, are easy to synchronize or may be of like design.

Further advantageous aspects and developments of the subject matter of claim 5 are set forth in claims 6 to 11, and advantageous aspects of receivers for a transmission system as claimed in claims 5 to 11 are set forth in claims 12 to 15.

If a signal unit consists of several parts (words), a circulating word counter as referred to in claim 7 advantageously co-ordinates and monitors the order of the parts (words) to be transmitted at the clock inputs of the information-storing and control arrangement.

Through the measures taken by the switchable attenuator as claimed in claim 8, that range of the first message which is suppressed for the pilot band but transmitted in the conventional transmission system is schematically restored for the listener in an advantageous manner.

The use of a quadrature modulator in the modulating arrangement of the transmitter (claim 9) makes it possible in an advantageous manner to use a single pilot signal for the transmission of the multiplex and sync signals without mutual interference between these signals and, in particular, allows the use of the especially low-noise synchronous demodulator (claim 14) in the receivers.

Further advantages will be apparent from the following description of a few embodiments of the invention, which explain the invention in more detail. In the accompanying drawings, FIG. 1 is a block diagram of a transmitter of a transmission system;

Figure 1:
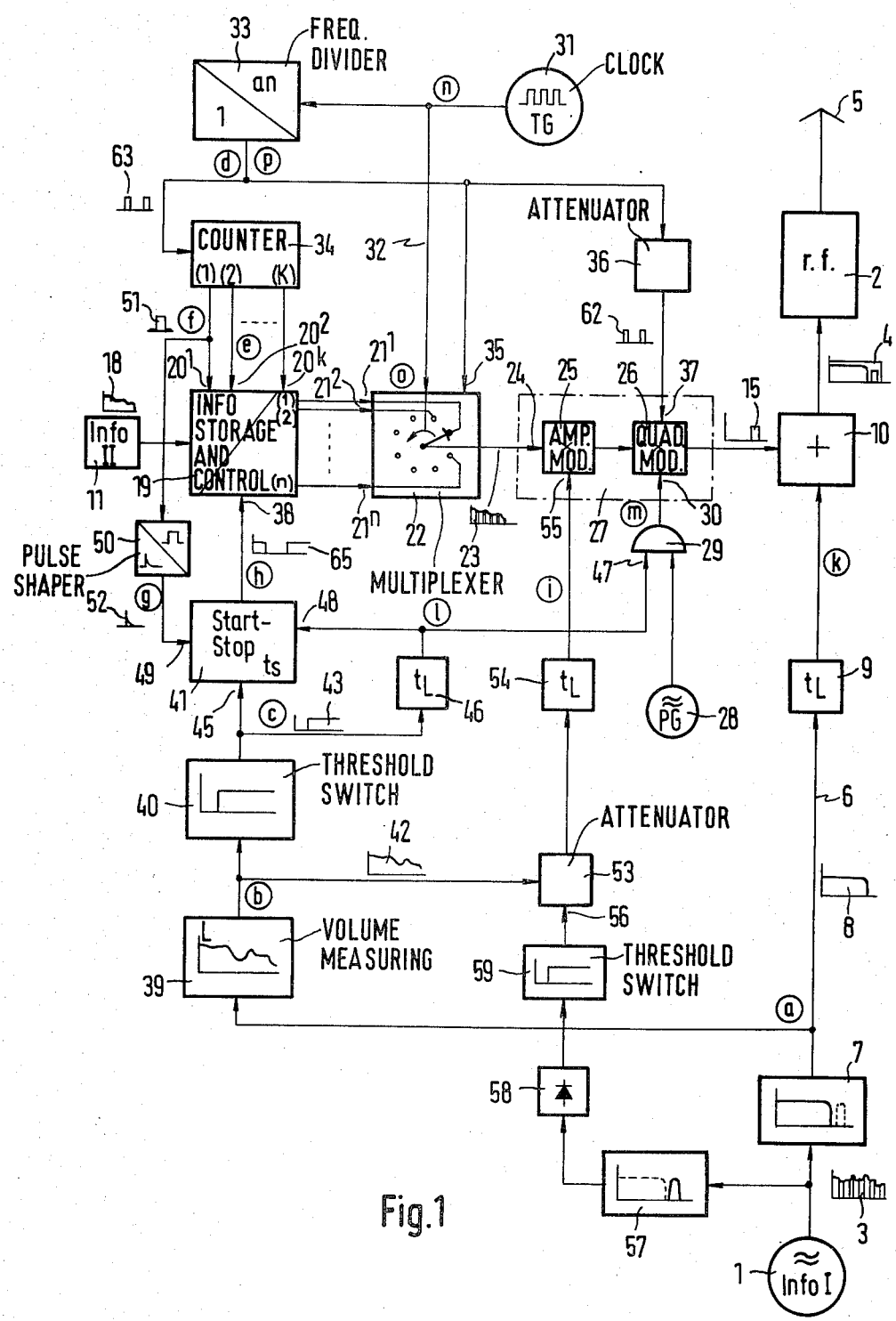

The block diagram of FIG. 1 shows an embodiment of a transmitter of a transmission system for carrying out the transmission method according to the invention. To transmit a sound message, the transmitter contains the arrangements generally included in conventional transmitters for transmitting such sound messages, namely an audio-frequency unit, i.e. a sound source 1, and a radio-frequency unit 2, in which a first message, the sound message 3, is modulated in a transmission channel 4 on an RF carrier wave and radiated via an antenna 5. In the AF line 6, a band- or low-pass filter 7 for passing the sound message in a baseband 8, a delay line 9 providing a constant delay $t_L$ for all frequencies of the baseband, and an adder 10 are inserted between the output of the sound source 1 and the input of the RF unit. The remaining portion of the block diagram, i.e., the portion on the lefthand side of the AF line 6, serves to process a second message which is entered into the transmitter via an input device 11 and transmitted, in addition to the first message—the sound message—, over the transmission channel of the first message.

Figure 2:
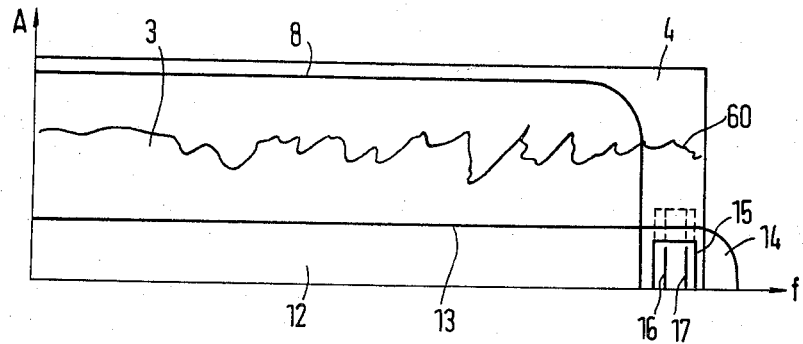
FIG. 2 shows the transmission channel for the first message in a schematic diagram.

FIG. 2 is a schematic diagram showing the channel for transmitting the first message. The abscissa is the frequency axis f, and the ordinate the amplitude axis A. The rectangle 4 between the axes f and A represents the transmission channel. In this transmission channel, the sound message 3 is transmitted within a baseband whose upper limit is indicated by the line 8. The sound message generates an ear-physiological masking range 12, which is limited by an ear-physiological threshold of audibility 13, and a portion 14 of which extends in frequency beyond the baseband 8. The threshold of audibility is directly dependent on the instantaneous volume of the sound message in the baseband. A sound which remains completely within the masking range 12—even if it is within the portion 14 of the masking range—is completely masked by the sound message 3 in the baseband. The baseband 8 is so limited in frequency that at the higher-frequency end of the transmission channel, there is space for a narrow pilot band 15 for one or more pilot signals, two of which, 16 and 17, are indicated in the figure. The pilot band lies outside the baseband but still within the transmission channel and within the masking range 12. By means of the pilot signals in the pilot band, the second message is transmitted.

In the transmitter shown in FIG. 1, the second message 18 is fed from the input device 11 to an information-storing and control arrangement 19, where it is divided into information units and passed on to inputs $21^1$ to $21^n$ of a multiplexer 22 in response to control signals applied to the clock inputs $20^1$ to $20^k$. The multiplexer forms from the information units a time-division multiplex signal 23, which is applied to a modulation input 24 of a first modulator 25 for positive amplitude modulation, and from there to a second modulator 26, e.g. a quadrature modulator in a modulating arrangement 27. In the second modulator 26, the signal from the first modulator 25 is modulated on a pilot signal from a pilot generator 28 connected to the carrier input 30 of the second modulator via an AND gate 29. The output signals of the second modulator are passed on as modulated pilot signals (e.g. 16 and 17) or quadrature signal components of the pilot band 15 to a second input of the adder 10 and added there to the sound message of the baseband, so that the whole information content of the first and second messages of the transmission channel 4 is available at the output of the adder.

The time-division multiplex steps of the multiplexer 22, shown schematically as a rotating switch, are controlled by a clock-pulse generator 31 via the clock line 32. At the same time, the frequency of the clock-pulse generator is divided in a frequency divider 33, whose output is coupled to the count input of a circulating word counter 34, to the set input 35 of the multiplexer, and, via an attenuator 36, to the second modulation input 37 of the second modulator 26. The division factor of the frequency divider 33 is an integral multiple a of the number n of steps of a complete cycle of the multiplexer, the multiple a corresponding to the number of clock pulses required to advance the multiplexer by one step.

The circulating word counter 34 has one output for each counting step. These step outputs are coupled to the clock inputs $20^1$ to $20^k$ of the information-storing and control arrangement 19. The number of clock inputs corresponding to the number k of parts constituting a signal unit of the second message and each consisting of n information units. The information-storing and control arrangement 19 also has a start-stop input 38, to which is connected a cascade which starts at the output of the baseband-pass filter 7 in the AF line 6 and consists of a volume-measuring device 39, a threshold switch 40, and a start-stop circuit 41. The volume-measuring device derives from the sound message of the baseband a volume signal 42, which represents the variation with time of the mean volume of the sound message. This volume signal generates an operating signal 43 at the output of the threshold switch 40 as long as it has a level H greater than a voltage threshold 44 adjustable in the threshold switch (cf. diagram b in FIG. 3). The output of the threshold switch 40 is connected directly to the signal input 45 of the start-stop circuit 41 and, via a delay line 46, to the enable input 47 of the AND gate 29 for the pilot generator and to a start input 48 of the start-stop circuit. The stop input 49 of the start-stop circuit 41 is connected to the first clock input $20^1$ of the information-storing and control arrangement 19 via a pulse shaper 50, which produces an output pulse 52 only on the leading edge of an input pulse 51. The output of the volume-measuring device 39 is connected, via an attenuator 53 and an additional delay line 54, to the second modulation input 55 of the modulator 25 for positive modulation of the multiplex signals 23. The delay lines 46 and 54 provide the same frequency-independent delay $t_L$ as the delay line 9 in the AF line 6.

A further control cascade is disposed between the output of the sound source 1 and a control input 56 of the attenuator 53 and consists of a band-pass filter 57 for the pilot band, a rectifier circuit 58, and a threshold switch 59. The rectifier circuit 58 derives from the sound-message components 60 not transmitted in the pilot band (FIG. 2) a direct-current signal which produces a control signal for the attenuator 53 when a preset threshold is exceeded in the threshold switch 59. This control signal switches the attenuator 53 to a second state, in which it provides reduced attenuation.

Figure 3:
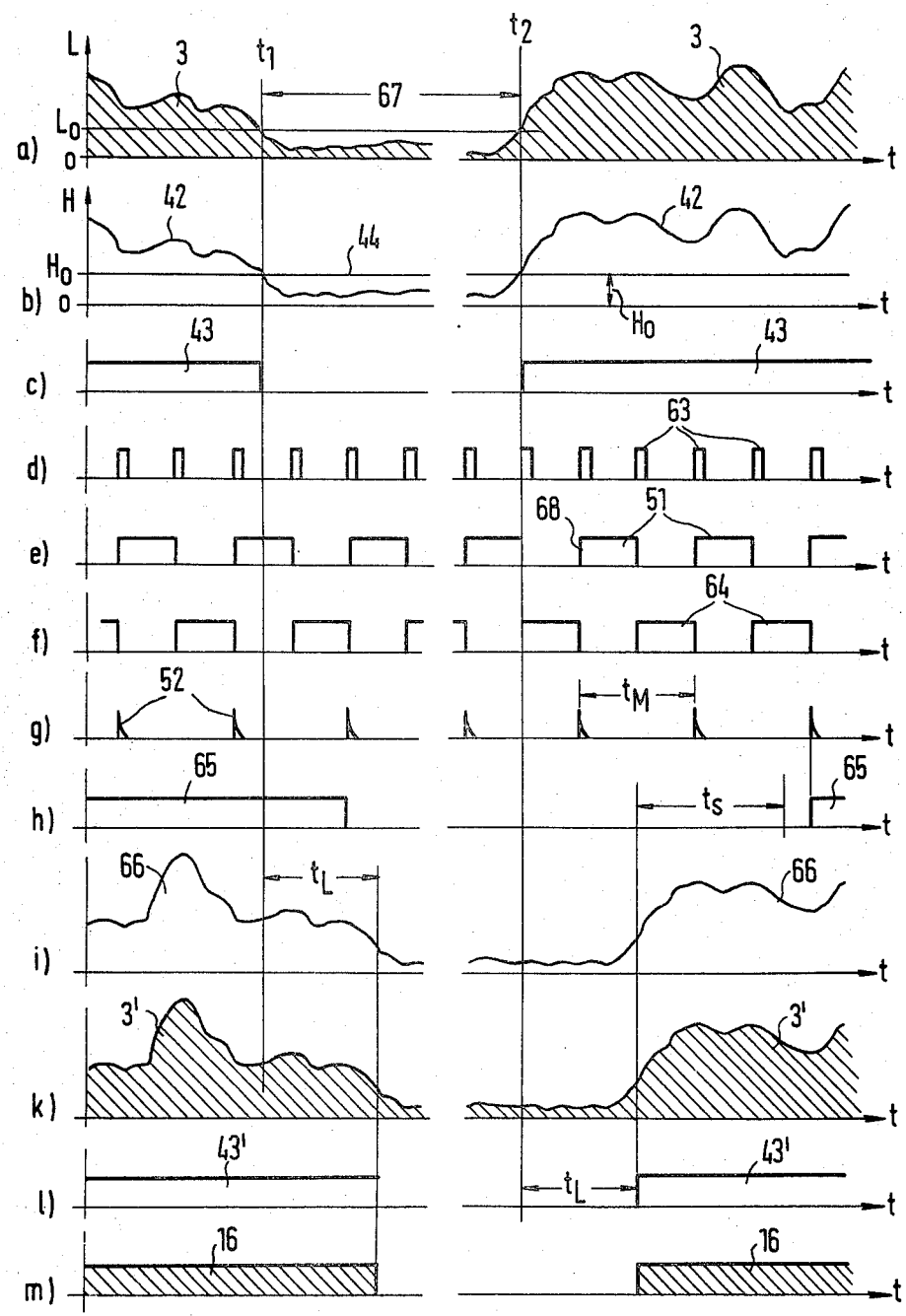
FIG. 3 shows graphs (a) to (m) of the signal occurring in an embodiment of a transmission system for carrying out the method according to the invention, particularly with a transmitter as shown in FIG. 1.

The operation of the transmitter shown in FIG. 1 and the transmission method according to the invention will now be explained with the aid of the graphs a) to m) of FIG. 3. Throughout the graphs, the abscissas represent the same duration of the time t, while the ordinates represent the amplitudes of the signals shown in the graphs. In the graphs of FIG. 3, it is assumed for simplicity that a signal unit of the second message consists of two "words" which are transmitted in two multiplexer cycles. In that case, the circulating word counter 34 may advantageously be a clocked flip-flop which, on the occurrence of every clock pulse at its input, assumes either a first or a second state, with a signal being produced either at one or at the other of its outputs.

In the graph (a) the mean volume of the sound message 3 on the AF-line 6 is plotted against time. The sound measure 3 is delayed by the time $t_L$ in the delay line 9 and applied to the adder 10. The delayed sound message 3 is shown in the graph (k). At the same time, the adder is fed with the quadrature components of the pilot signal 16, which have been positively modulated with the multiplex signals representing the second message and with a sync signal 62. The quadrature components are formed in the modulator 26, which is designed as a quadrature modulator in a known manner, from the pilot wave 16 generated at the output of the AND gate 29 of the pilot generator 28 and shown schematically in graphs m). One of the quadrature components contains, for example, the sync signal, and the other the multiplex signals. The sync signal 62 is the output signal 63 of the frequency divider 33, which has been attenuated by the attenuator 36, and is necessary to synchronize the demultiplexer in the receivers of the transmission system. The attenuation is adjusted so that the sync signalscan be received perfectly at low cost. The output signals 63 of the frequency divider 33, which are shown in the graph (d), also set the multiplexer 22 at its set input 35 to the initial position "1" if it should have broken step, and act as count pulses on the word counter 34, which is designed as a clocked flip-flop. The signals 51 and 64 at the word-counter outputs connected to the clock inputs $20^1$ and $20^2$ of the information-storing and control circuit 19 are shown in the graphs (3) and (f). When a signal 51 appears at the first clock input $20^1$, the information-storing and control arrangement 19 applies the first part—the first word—of a signal unit of the second message 18 stored in the arrangement 19 to the inputs $21^1$ to $21^n$ of the multiplexer 22, and when a signal 64 appears at the second clock input $20^2$ of the arrangement 19, the latter applies the second part (the second word) of the signal unit to the multiplexer inputs, if an output signal 65 (graph h) of the start-stop circuit 41 is applied at the start-stop input 38 of the arrangement 19.

From the variation with time of the mean volume of the sound message 3, the volume-measuring device 39 forms a volume signal 42 (graph b) which generates an operating signal 43 (graph c) in the threshold switch 40 when rising above a threshold voltage 44 set in the threshold switch. The volume signal is also passed through the attenuator 53 and the delay line 54 and then serves as a modulating signal 66 (graph i) to positively modulate the multiplex signals 23 in the modulator 25. The attenuation in the attenuator 53 is adjusted so that the pilot signal's quadrature component, which is positively modulated with the multiplex signals proportionally influenced by the modulating signal 66, always remain within the masking range 12 (FIG. 2). The delay line 54 must provide the same delay $t_L$ as the delay line 9 for the sound measure in order that the variation with time of the amplitude of the modulating signal 66 conforms to the variation with time of the mean volume and, thus, of the ear-physiological masking range 12 (FIG. 2).

The voltage threshold 44 in the threshold switch 40 is set so that the threshold switch interrupts the generation of an operating signal 43 as long as the volume signal 42 remains below a value Ho which corresponds to the mean volume value Lo of the sound message and at which the pilot signal's quadrature component, modulated with the sync signal, would exceed the ear-physiological threshold of audibility 13. Between the instants $t_1$ and $t_2$, a period 67 of low volume of the sound message 3 is shown in the graph (a), during which the volume signal 42 remains below the voltage threshold 44 of the threshold switch, so that the latter provides no operating signal 43 during that period. During that time, the transmission of the second message 18 must be interrupted, because otherwise the pilot signal modulated with the sync signal would be audible as an interference signal in receivers located in the coverage area of the transmitter. On the other hand, however, it is necessary that a transmission of a signal unit of the second message that has been started be completed, because otherwise this signal unit would be lost. Therefore, the sound message 3 must be delayed by the delay line 9 at least until the transmission of the signal unit being transmitted during the onset of the drop in volume is completed, i.e., the delay $t_L$ provided by the delay lines 9 and 54 must be at least equal to the time $t_M$ required to transmit a signal unit of the second message 18. During that time, the pilot signal 16 must be generated, too; it is interrupted by switching off or cutting out the pilot generator 28, e.g. by means of the AND gate 29. Therefore, the line over which the operating signal 43 is transmitted to the start-stop input 47 of the AND gate must include an additional delay line 46 which provides the same delay $t_L$ as the two other delay lines. The delayed operating signal 43' is shown in graph (l).

Despite the absence of the operating signal 43, the start-stop circuit 41 continues to provide an output signal 65 until a signal 52 appears at its stop input 49. This signal 52, which is shown in graph (g) is formed in the pulse shaper 50, e.g. a differentiator, from the leading edge 68 of each selection signal 51 appearing at the clock input $20^1$.

At the end of the volume reduction 67, the volume signal 42 again exceeds the threshold 44 in the threshold switch 40, so that the latter again provides an operating signal 43, which, delayed by the delay $t_L$ (delayed operating signal in graph (l)), restarts the pilot generator (graph (m)) and starts a start delay at the start input 48 of the start-stop circuit 41 whose time $t_s$ is equal to the synchronization time of the demultiplexer units in the receivers. As the pulse 52 following the delay $t_s$ appears at the control input 49, the start-stop circuit again generates the output signal for continuing the transmission of the second message.

Figure 4:
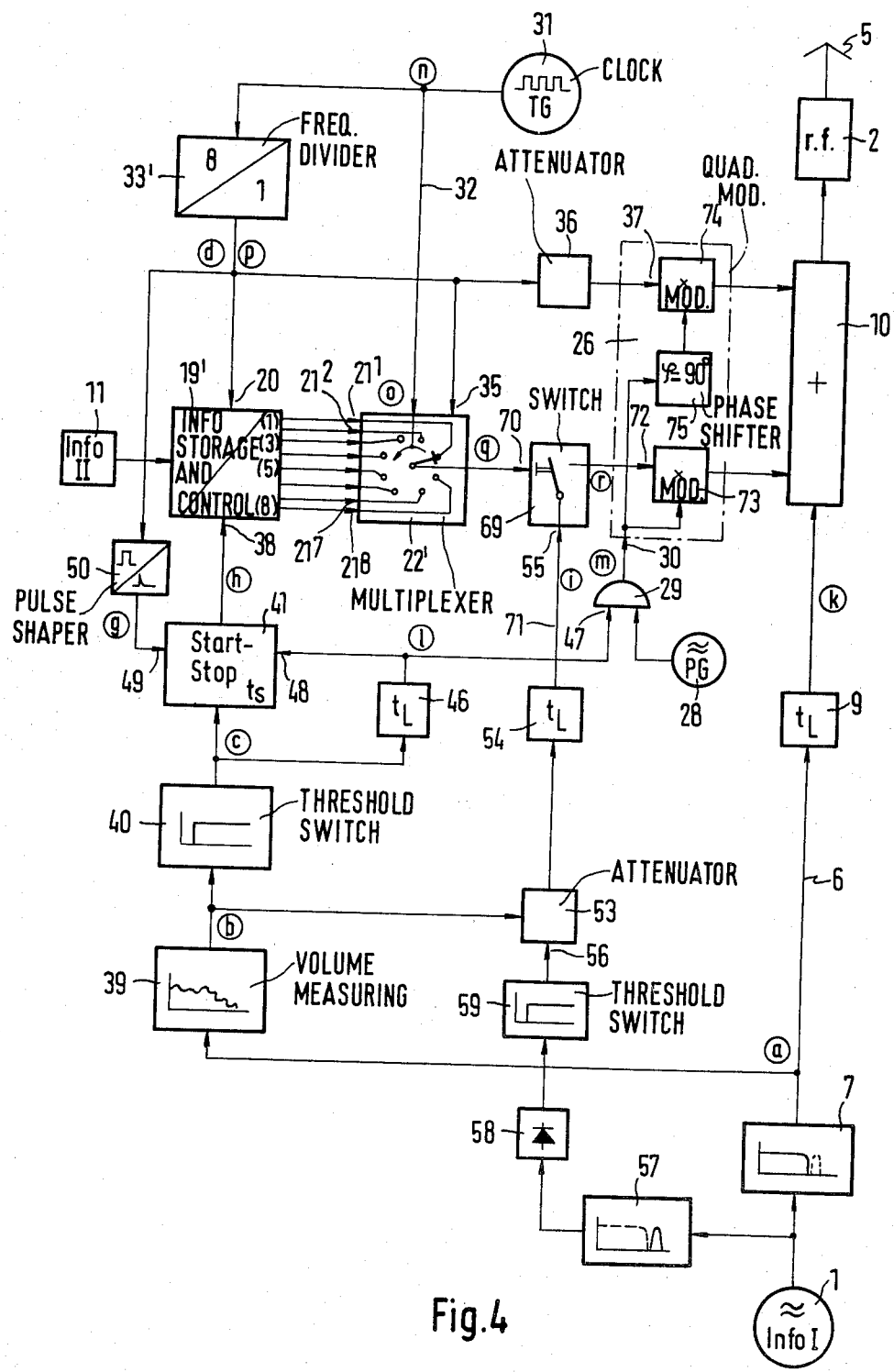
FIG. 4 is a block diagram of another embodiment of a transmitter.

FIG. 4 is a block diagram of another embodiment of a transmitter for a transmission system for carrying out the transmission method according to the invention. This transmitter is designed for eight multiplex steps and for the transmission of digital information as a second message 18 in which a signal to be transmitted consists of two eight-bit words, for example. Each signal thus represents a signal unit. Whether the transmitted word is the first or second word of a signal is apparent from the configuration of the bits of a word. Therefore, the transmitter shown requires no word counter, and in the transmitter's information-storing and control arrangement 19', the word order need not be taken into account, so the arrangement 19' needs only one clock input 20 which is controlled directly by the output signals 63 of the frequency divider 33' for dividing the frequency of the clock generator 31 at a ratio of 8:1.

Otherwise the design of the transmitter of FIG. 4 is essentially the same as that of the transmitter shown in FIG. 1. Similar or corresponding arrangements, units, parts or signals are therefore designated by like reference characters. In the transmitter of FIG. 4, the modulator designated 25 in FIG. 1 is an electronic switch 69 whose control input 70 is connected to the output of the multiplexer 22' and in which the line 71 for the modulating signal 66 formed from the volume signal 42 can be connected directly to the modulation input 72 of a first product modulator 73 of a quadrature modulator 26, which is shown in detail. When the electronic switch is closed, i.e., when a signal is applied to the control input 70, the modulating signal 66 is applied directly to this modulation input 72; when the electronic switch is open, no signal voltage is applied to this modulation input, so that the product modulator 73 can produce no output signal. A second product modulator 74 is provided for modulating the sync signals 62 upon a component of the pilot signal 16 shifted in phase by 90° with respect to the fundamental component in a phase shifter 75.

Instead of the two components of one pilot signal, 16, two different pilot signals 16 and 17 from two different pilot generators may be used to product-modulate the sync signal and the multiplex signal. At the receiving end, however, this increases the cost and complexity of the demodulation circuit and causes more serious interference.

Figure 5:
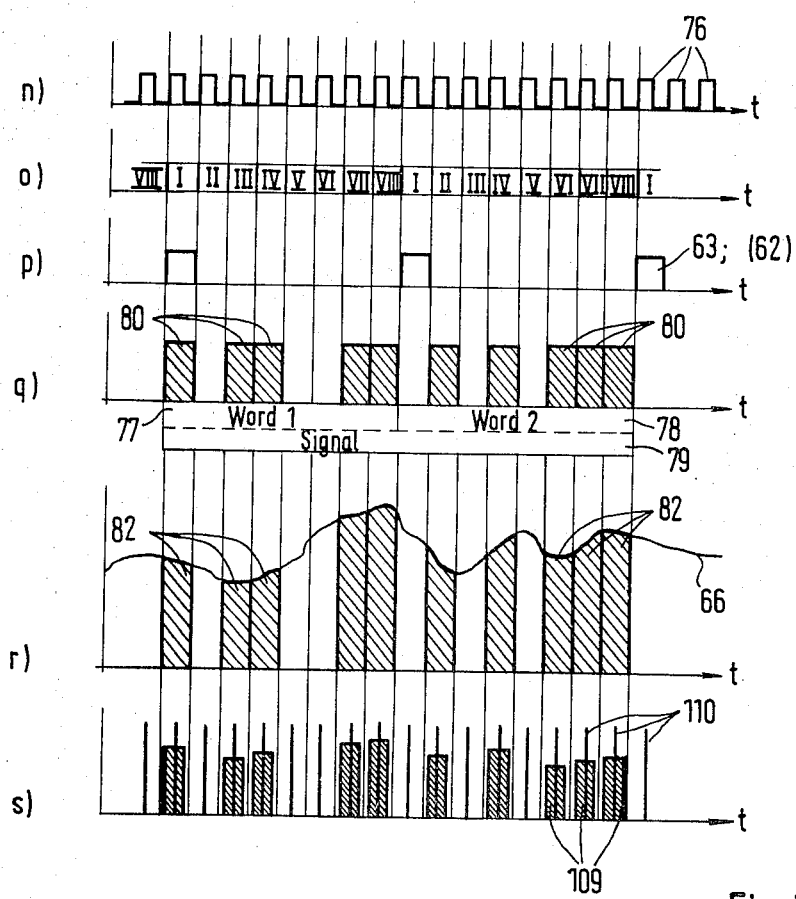
FIG. 5 shows graphs (n) to (s) illustrating the transmissionn of a signal of a digital second message consisting of two eight-bit words.

In FIG. 5, the graphs (n) to (s) show how a signal consisting of two eight-bit words is transmitted with a transmitter as shown in FIG. 4. In these graphs the abscissa is the time axis t, and the ordinate represents the amplitude. Graph (n) shows the wave provided by the clock generator 31. Each of the pulses 76 advances the multiplexer 22' by one step, as shown in graph (o). Graph (p) shows the output signals 63 of the frequency divider 33', which, after being attenuated, also represent the sync signals 62. Graph (q) shows a first word 77 and a second word 78 of a signal 79 in which each word consists of eight bits 80. Each bit may contain a signal ("1") or no signal ("0"). With each cycle of the multiplexer 22', one of these words is transmitted. The signal content of the individual bits, each of which is assigned to one of the multiplex steps I to VIII, controls the electronic switch 69, so that the multiplex signals 82 (graph (r)), modulated with the volume of the sound message 3', are cut out of the modulating signal 66 (graph (r)) applied at the signal input 55 of the electronic switch 69. These multiplex signals 82 are modulated positively onto the pilot signal 16.

Figure 6:
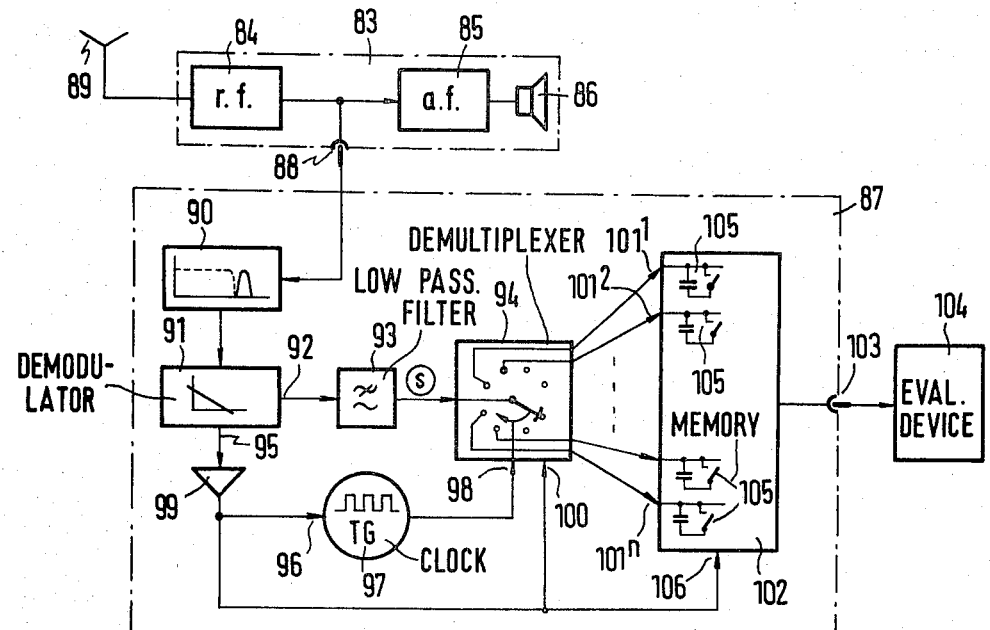
FIG. 6 shows an embodiment of a receiver for receiving a transmission from a transmitter as shown in FIG. 1.

The block diagram of FIG. 6 shows an embodiment of a receiver suitable for receiving the information transmitted from a transmitter as shown in FIG. 1. In the example shown, the receiver consists of a commercially available radio set 83 for receiving the sound message 3, with a conventional RF unit 84 and a conventional AF unit 85, and of a demultiplexing unit 87 for receiving the second message, which is connected to an audio-frequency output 88 provided between the RF unit and the AF unit of the radio set. The channel's information content arriving at the antenna 89 of the receiver and freed from the RF carrier wave in the RF unit is applied both to the demultiplexing unit and to the AF unit of the radio set. The modulated pilot signals 16 of the pilot band 15 remain inaudible in the loudspeaker since they are masked by the sound message of the baseband, as assumed hereinabove. The pilot signals 16 (and 17) pass through a pilot-band filter 90 of the demultiplexing unit 87 and are applied to a demodulator 91, in which both the multiplex signals and the sync signals are separated from the pilot signal. The demodulated multiplex signals are applied from the multiplex output 92 of the demodulator, via a low-pass filter 93 if necessary, to the signal input of a demultiplexer 94, while the demodulated sync signals are applied from a sync output 95 of the demodulator via an amplifier 99 to the sync input 96 of a synchronizable clock generator 97. The synchronizable clock generator 97 has the same clock frequency as the clock generator 31. (FIGS. 1 and 4) at the transmitting end and is synchronizable with the latter by means of the transmitted sync pulses. This insures that the demultiplexer 94, which is stepped on by the clock generator 97 via the control input 98, is in synchronism with the multiplexer 22 at the transmitting end, the more so since it is reset to the starting position whenever an amplified sync pulse appears at its reset input 100.

The signal outputs of the demultiplexer 94 are coupled to the signal inputs $101^1$ to $101^h$ of an output circuit 102, which stores the input signals, converts them into signal units of the second message 18, and passes these signal units on to an evaluation device 104 connected to its output 103. In a preferred embodiment, the output circuit 102 contains a short-term memory 105 at each of its signal inputs, which is shown symbolically in FIG. 6 as a capacitor with a discharge switch. During a short blanking time which is considerably shorter than the time of a demultiplexer step, this short-term memory 105 takes the value of the associated output of the demultiplexer and stores it for a period shorter than one cycle of the demultiplexer. To control the transfer and form the signal units of the second message, the output circuit 102 needs sync pulses at a control input 106.

Figure 7:
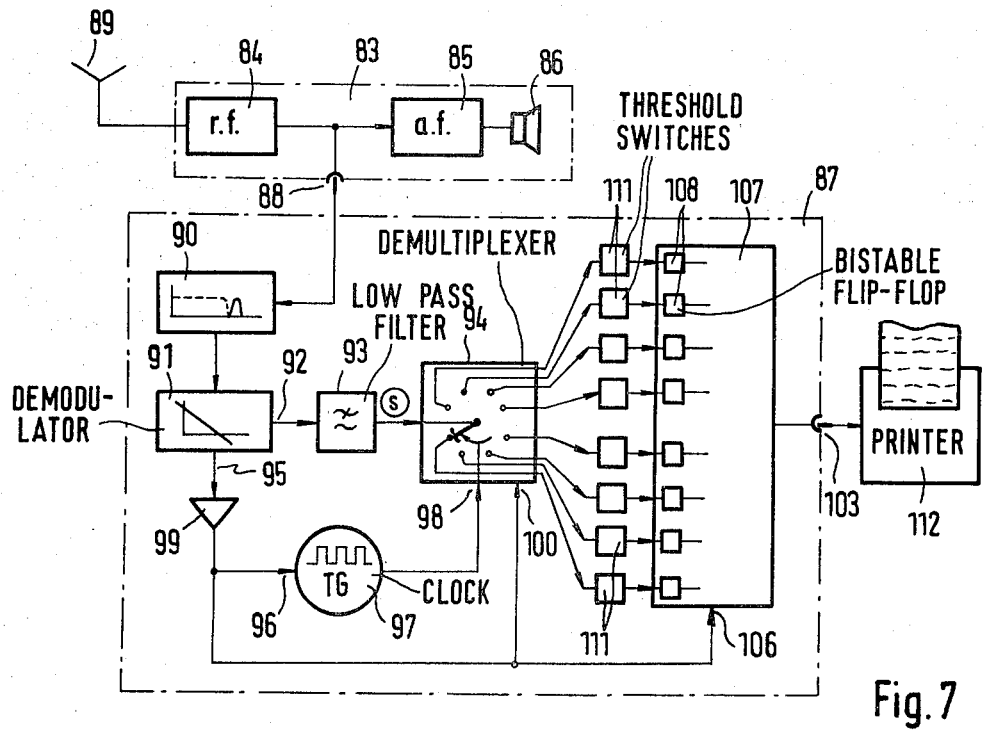
FIG. 7 shows an embodiment of a receiver for receiving a transmission from a transmitter as shown in FIG. 4.

The embodiment of a receiver shown in the block diagram of FIG. 7 is especially suited to receiving digital information as the second message, and matches a transmitter as shown in FIG. 4. In FIGS. 6 and 7, like units are designated by like reference characters. In the receiver of FIG. 7, the short-term memories in the output circuit 107 are bistables 108 which change state when a bit with a signal content appears at the associated signal output of the demultiplexer 94. The demultiplex signals 109 belonging to a transmitted signal 78 as shown in graph (q) of FIG. 5 are illustrated in graph (s) of FIG. 5. The lines 110 indicate schematically the sampling instants for the short-term memories 108. To prevent the states of the bistables 108 used as short-term memories from being changed by interfering signals, which would result in spurious signals, a threshold switch 111, e.g. a Schmitt trigger, is inserted into each signal line between the outputs of the demultiplexer 94 and the inputs $101^1$ to $101^8$ of the output circuit 107. Connected as an evaluation device to the output 108 of the output circuit 107 is a printer 112, which prints out the transmitted second message as a readable message or as readable data.

If the second message and the sync signal are modulated on the pilot signal by quadrature modulation, it is particularly advantageous to design the demodulators 95 of the receivers of FIGS. 6 and 7 as synchronous demodulators which are additionally synchronized by the sync signals and provide demodulation products having a particularly good signal-to-noise ratio.

Figure 8:
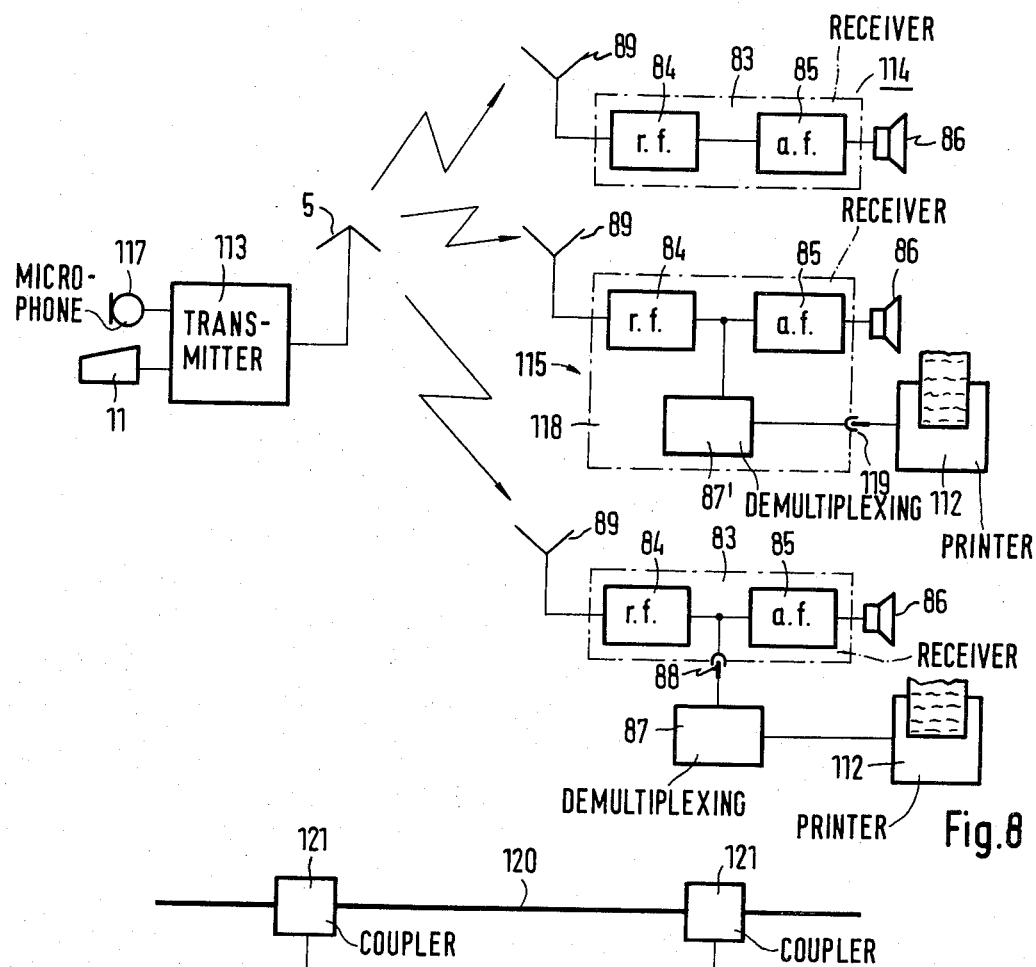
FIG. 8 shows a radio transmission system with a transmitter and several receivers.

FIG. 8 shows a transmission system with a transmitter 113 and receivers 114 to 116. The transmitter transmits a first message, fed to it, for example, via a microphone 117 connected thereto, and, at the same time, a second message, fed to it via an input device 11, to the receivers 114 to 116 by the method according to the invention. The messages are radiated via the antenna 5 of the transmitter and received by the antennas 89 of the receivers. The receiver 114 is a commercially available radio set 83 with a known RF unit 84 and a known AF unit 85, and is designed for delivery of the first message only. The receiver 116 contains the same radio set 83 as that of the receiver 114, but its audio-frequency output 88 is connected to a demultiplexing unit 87 followed by a printer 112. The demultiplexing unit 87 can also demodulate and represent the second message. The receiver 115 comprises a receiving apparatus 118 which contains an RF unit 84, an AF unit 85 with a loudspeaker 86 connected thereto, and a demultiplexing unit 87', and whose output 119 for the second message is connected to a printer 112.

Figure 9:
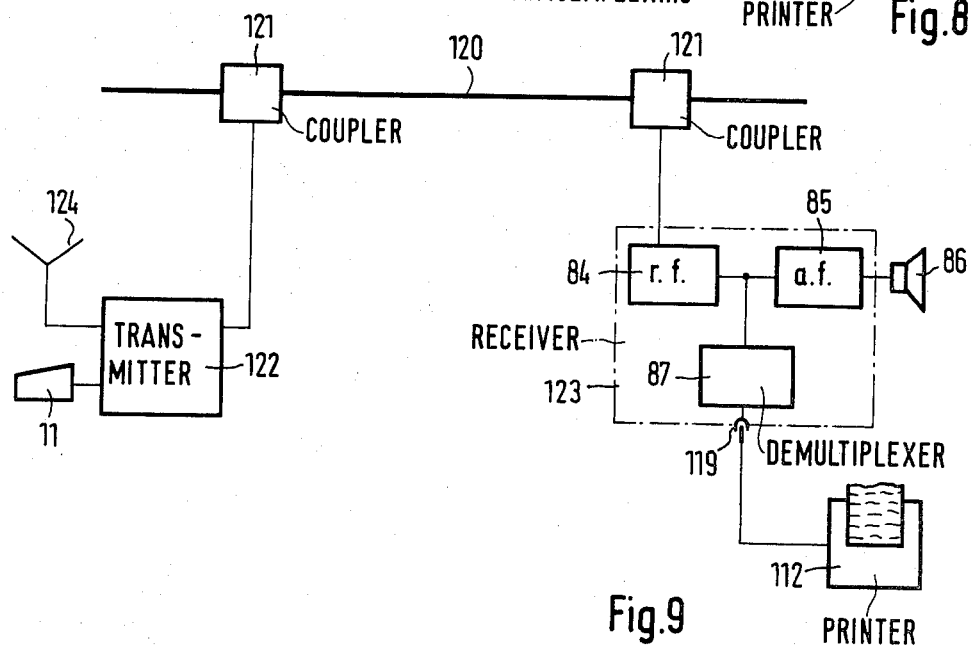
FIG. 9 shows a transmission system in which the transmitter and the receiver(s) are coupled to a line serving as a transmission path.

FIG. 9 shows a transmission system in which the transmission path is a line 120, e.g. an electric supply main. Via the coupling elements 121, a transmitter 122 and a receiver 123 are coupled to the line 120. The transmitter receives the first message via an antenna 124, and the second message via an input device 11. Both messages are transmitted over the line 120 in one transmission channel by the transmission method according to the invention, received by the receiver 123 via the coupling element 121, and demodulated in an RF unit 84 of known design, and the first message is made audible by an AF unit 85 of known design, while the second message is reproduced on an evaluation device, e.g. a printer 112, via a demultiplexing unit 87 of the above kind.

What is claimed is:

1. A method of transmitting two different messages on a carrier wave over a single transmission channel of predetermined bandwidth, the first of which messages is a sound message continuously varying in volume and is transmitted in a baseband nearly filling the transmission channel, and the second message of which is divided into information units, wherein the information units of the second message are transmitted as a multiplex signal on at least one pilot signal in a pilot band lying within the transmission channel, wherein the pilot band is located outside the baseband but within the masking range for inaudible tones, which reaches laterally beyond the baseband and is limited by an ear-physiological threshold of audibility and whose level is directly dependent on the volume of the sound message in the baseband, and wherein, in addition, a sync signal is transmitted on a pilot signal in the pilot band, comprising the steps of: transmitting the first message with a delay which is greater than the time of a number k of multiplex cycles forming a signal unit; deriving a volume signal from the first message which is proportional to the first message and is delayed by the same time as the first message; positively modulating the information units of the second message or the pilot signals with the delayed volume signal, the delayed volume signal being attenuated to the extent that the amplitudes of the pilot signals and of their spectra always lie in the masking range below the ear-physiological threshold of audibility; during a silent interval or a period of low volume of the first message, interrupting the transmission of the signals in the pilot band at the end of a signal unit forming part of the second message and being transmitted at the beginning of the silent interval or of the period of low volume; after the end of the silent interval or of the period of low volume, continuing the transmission of the sync signals with the same delay as that of the first message; and after a subsequent additional delay which is at least equal to the synchronization time of the multiplex operation, the transmission of the second message is continued as well.

2. A method as claimed in claim 1, wherein the attenuation of the volume signal is reduced so that the amplitude of the pilot signals projects beyond the masking range during the time that parts of the first information are occurring in the pilot band with a volume exceeding the masking range of the baseband.

3. A method as claimed in claim 1 wherein the information units of the second message, positively modulated with the attenuated and delayed volume signal, and the sync signals are superimposed on a single pilot signal by quadrature modulation.

4. A method as claimed in claim 1 wherein the signal units of the second message are digital signals consisting of several bits, and that the bits are the information units of the second message.

5. A transmitting system including at least one transmitter, a transmission path, and at least one receiver, wherein the transmitter includes means for providing a first message, a band-pass filter for a baseband, a multiplexer for multiplexing information units of a second message, a clock generator for stepping the multiplexer, a frequency divider connected to the clock generator and generating sync signals, a pilot generator for generating at least one pilot signal, a modulating arrangement for modulating the multiplexed information units and the sync signals upon the pilot signals, and an adding circuit which adds the information contents for the transmission channel, and wherein at least one receiver includes a radio-frequency unit, an audio-frequency unit, a demultiplexer unit for receiving the second message, said demultiplexer unit including a pilot-band filter, a demodulator for recovering the information units of the second message and of the sync signals, a demultiplexer operating at the same stepping rate as that of the multiplexer, a following storage-type output circuit, and a clock generator for controlling the demultiplexer steps which is capable of being synchronized by the sync signals, wherein the transmitter additionally comprises: firstly, an information-storing and control arrangement for the second message whose clock input is connected to the output of the clock generator or of the frequency divider, and which applies the information units to the signal inputs of the multiplexer according to the control by the clock signals or output signals of the frequency divider at the clock input and to the signal character of the second message, secondly, a branch inserted between the band-pass filter for the baseband and a start-stop input of the information-storing and control arrangement and consisting of a volume-measuring device, a threshold switch and a start-stop circuit in series, thirdly, a first delay line inserted between the output of the band-pass filter and the adding circuit and providing a delay greater than the time of a number of multiplex cycles forming a signal unit, fourthly, a series arrangement inserted between the output of the volume-measuring device and an input for positive modulation of the pilot band of the modulator and consisting of an attenuator, a second delay line providing a delay equal to that of the first delay line, and a positive modulator, the attenuation of the attenuator being adjusted so that the instantaneous value of the volume signal lies exclusively within the masking range of the sound message of the baseband, fifthly, the output of the threshold switch is connected to a start-stop input of the pilot generator and to a start input of the start-stop circuit via a third delay line which provides a delay equal to that of the first delay line, that the threshold of the threshold switch is adjusted so that the threshold switch interrupts the generation of an output signal as long as the volume signal applied to its input does not reach a value at which the amplitude of the pilot signal is greater than the ear-physiological threshold of audibility of the associated masking range, and that the start-stop circuit is designed so that, if no signal appears at its signal input connected to the threshold switch, it continues to generate an operating signal for the information-storing and control arrangement until a signal appears at a stop input connected to the output of the clock generator or of the frequency divider via a pulse shaper, and that, when a signal is applied to its signal input, the start-stop circuit does not begin to generate an operating signal until a signal appears at the start input, which is connected to the third delay line.

6. A transmission system as claimed in claim 5, wherein the pulse shaper of the transmitter is a differentiator which delivers an output pulse on the leading edge of an input pulse.

7. A transmission system as claimed in claim 5 wherein the information-storing and control arrangement of the transmitter has a plurality of clock inputs, a circulating word counter is connected between the output of the frequency divider and the clock inputs of the information-storing and control arrangement, and the stop input of the start-stop circuit is connected to one of the outputs, preferably to the first output of the word counter via the pulse shaper.

8. A transmission system as claimed in claim 5 wherein the attenuator in the transmitter has a control input and is switchable, by a signal applied to its control input, to a second state of attenuation which attenuates the instantaneous values of the volume signal to a value greater than the ear-physiological threshold of audibility of the associated masking range, and that a control branch containing a bandpass filter for the pilot band, a rectifier circuit and a second threshold switch is inserted between the output of the sound source of the transmitter and the control input of the attenuator.

9. A transmission system as claimed in claim 5 wherein the modulating arrangement of the transmitter contains a quadrature modulator in which the multiplexed information units of the second message are positively modulated on one of the quadrature components of the pilot signal, and in which the sync signals are modulated on the other quadrature component of the pilot signal.

10. A transmission system as claimed in claim 5 wherein the modulating arrangement of the transmitter contains an electronically controlled switch which is inserted between the delay line for the volume signal and a second input for the positive modulation of the modulating arrangement and has a control input for opening and closing the switch, and that this control input is connected to the output of the multiplexer.

11. A transmission system as claimed in claim 5 wherein the transmission path is an electric line to which the transmitters and the receivers are coupled.

12. A transmission system as claimed in claim 5 wherein the storage-type output circuit of the demultiplexer unit is a signal-decoding and control arrangement having a sync input and an output for connection to an evaluation device, and that the sync input of the signal-decoding and control arrangement is connected to the sync output of the demodulator.

13. A transmission system as claimed in claim 12, wherein the threshold switches are connected between the outputs of the demultiplexer and the signal inputs of the signal-decoding and control circuit.

14. A transmission system as claimed in claim 12 wherein the demodulator of the demultiplexer unit is a synchronous demodulator.

15. A transmission system as claimed in claim 12 wherein the demultiplexer unit is connected to the radio-frequency output of a commercially available receiver which contains a radio-frequency unit and an audio-frequency unit and wherein the audio-frequency output is connected to the output of the radio-frequency unit.

16. A transmitter including means for providing a first message, a band-pass filter for a baseband, a multiplexer for multiplexing information units of a second message, a clock generator for stepping the multiplexer, a frequency divider connected to the clock generator and generating sync signals, a pilot generator for generating at least one pilot signal, a modulating arrangement for modulating the multiplexed information units and the sync signals upon the pilot signals, and an adding circuit which adds the information contents for transmission and the transmitter additionally comprises: firstly, an information-storing and control arrangement for the second message whose clock input is connected to the output of the clock generator or of the frequency divider, and which applies the information units to the signal inputs of the multiplexer according to the control by the clock signals or output signals of the frequency divider at the clock input and to the signal character of the second message, secondly, a branch inserted between the band-pass filter for the baseband and a start-stop input of the information-storing and control arrangement and consisting of a volume-measuring device, a threshold switch and a start-stop circuit in series, thirdly, a first delay line inserted between the output of the band-pass filter and the adding circuit and providing a delay greater than the time of a number of multiplex cycles forming a signal unit, fourthly, a series arrangement inserted between the output of the volume-measuring device and an input for positive modulation of the pilot band of the modulator and consisting of an attenuator, a second delay line providing a delay equal to that of the first delay line, and a positive modulator, the attenuation of the attenuator being adjusted so that the instantaneous value of the volume signal lies exclusively within the masking range of the sound message of the baseband, fifthly, the output of the threshold switch is connected to a start-stop input of the pilot generator and to a start input of the start-stop circuit via a third delay line which provides a delay equal to that of the first delay line, that the threshold of the threshold switch is adjusted so that the threshold switch interrupts the generation of an output signal as long as the volume signal applied to its input does not reach a value at which the amplitude of the pilot signal is greater than the ear-physiological threshold of audibility of the associated masking range, and that the start-stop circuit is designed so that, if no signal appears at its signal input connected to the threshold switch, it continues to generate an operating signal for the information-storing and control arrangement until a signal appears at a stop input connected to the output of the clock generator or of the frequency divider via a pulse shaper and that, when a signal is applied to its signal input, the start-stop circuit does not begin to generate an operating signal until a signal appears at the start input, which is connected to the third delay line.

17. A transmitter as claimed in claim 16, wherein the pulse shaper is a differentiator which delivers an output pulse on the leading edge of an input pulse.

18. A transmitter as claimed in claim 16, wherein the information-storing and control arrangement has a plurality of clock inputs, a circulating word counter is connected between the output of the frequency divider and the clock inputs of the information-storing and control arrangement, and the stop input of the start-stop circuit is connected to one of the outputs, preferably to the first output of the word counter via the pulse shaper.

19. A transmitter as claimed in claim 16, wherein the attenuator has a control input and is switchable, by a signal applied to its control input, to a second stage of attenuation which attenuates the instantaneous values of the volume signal to a value greater than the ear-physiological threshold of audibility of the associated masking range, and that a control branch containing a band-pass filter for the pilot band, a rectifier circuit and a second threshold switch is inserted between the output of the sound source of the transmitter and the control input of the attenuator.

20. A transmitter as claimed in claim 16, wherein the modulating arrangement contains a quadrature modulator in which the multiplexed information units of the second message are positively modulated on one of the quadrature components of the pilot signal, and in which the sync signals are modulated on the other quadrature component of the pilot signal.

21. A transmitter as claimed in claim 16 wherein the modulating arrangement contains an electronically controlled switch which is inserted between the delay line for the volume signal and a second input for the positive modulation of the modulating arrangement and has a control input for opening and closing the switch, and that this control input is connected to the output of the multiplexer.

22. A receiver for use in a transmission system of the type that includes a transmitter having means for providing a first message, a bandpass filter for passing said first message in a baseband, a multiplexer for multiplexing information units of a second message, a clock generator for stepping the multiplexer, a frequency divider connected to the clock generator and generating sync signals, a pilot generator for generating at least one pilot signal, a modulating arrangement for modulating the multiplexed information units and the sync signals upon the pilot signals, and an adding circuit which adds the information contents for transmission wherein said receiver comprises a radio-frequency unit, an audio-frequency unit, a demultiplexer unit for receiving the second message, said demultiplexer unit including a pilot-band filter, a demodulator for recovering the information units of the second message and of the sync signals, a demultiplexer operating at the same stepping rate as that of the multiplexer, a following storage-type output circuit, and a clock generator for controlling the demultiplexer steps which is capable of being synchronized by the sync signals.

23. A receiver as claimed in claim 22, wherein the storage-type output circuit of the demultiplexer unit is a signal-decoding and control arrangement having a sync input and an output for connection to an evaluation device and that the sync input of the signal-decoding and control arrangement is connected to the sync output of the demodulator.

24. A receiver as claimed in claim 22 wherein threshold switches are connected between the outputs of the demultiplexer and the signal inputs of the signal-decoding and control circuit.

25. A receiver as claimed in claim 22, wherein the demodulator of the demultiplexer unit is a synchronous demodulator.

26. A receiver as claimed in claim 22 wherein the demultiplexer unit is connected to the radio-frequency output of a commercially available receiver which contains a radio-frequency unit and an audio-frequency unit and wherein the audio-frequency output is connected to the output of the radio-frequency unit.

* * * * *